US007976216B2

(12) United States Patent
Timans

(10) Patent No.: US 7,976,216 B2
(45) Date of Patent: Jul. 12, 2011

(54) DETERMINING THE TEMPERATURE OF SILICON AT HIGH TEMPERATURES

(75) Inventor: Paul Janis Timans, Mountain View, CA (US)

(73) Assignee: Mattson Technology, Inc., Fremont, CA (US)

( * ) Notice: Subject to any disclaimer, the term of this patent is extended or adjusted under 35 U.S.C. 154(b) by 556 days.

(21) Appl. No.: 11/961,526

(22) Filed: Dec. 20, 2007

(65) Prior Publication Data
US 2009/0161724 A1    Jun. 25, 2009

(51) Int. Cl.
*G01G 5/00*  (2006.01)
*G01K 17/08* (2006.01)
*G01K 11/00* (2006.01)

(52) U.S. Cl. .......... 374/45; 374/121; 374/137; 374/161; 374/2; 438/14; 438/16; 250/338.1

(58) Field of Classification Search .................. 374/120, 374/121, 124, 126, 129, 137, 100, 161, 43, 374/44, 45, 2, 8, 57; 250/227.14, 228.1, 250/340, 341, 341.8, 338.1, 251.1; 438/14, 438/16; 356/43, 216, 432, 933, 923, 939
See application file for complete search history.

(56) References Cited

U.S. PATENT DOCUMENTS

| | | | |
|---|---|---|---|
| 2,792,484 A | | 5/1957 | Gurewitsch et al. |
| 4,764,026 A | | 8/1988 | Powell et al. |
| 4,841,150 A | | 6/1989 | Walter |
| 4,890,245 A | | 12/1989 | Yomoto et al. |
| 4,890,933 A | | 1/1990 | Amith et al. |
| 5,098,199 A | | 3/1992 | Amith |
| 5,102,231 A | * | 4/1992 | Loewenstein et al. ........ 374/129 |
| 5,118,200 A | * | 6/1992 | Kirillov et al. ................ 374/120 |
| 5,167,452 A | | 12/1992 | Amith et al. |
| 5,170,041 A | | 12/1992 | Amith et al. |
| 5,180,226 A | | 1/1993 | Moslehi |
| 5,208,643 A | | 5/1993 | Fair |
| 5,229,303 A | | 7/1993 | Donnelly, Jr. et al. |
| 5,258,602 A | * | 11/1993 | Naselli et al. ................. 219/497 |

(Continued)

FOREIGN PATENT DOCUMENTS

WO    9919700 A1    4/1999

(Continued)

OTHER PUBLICATIONS

*Real-time, noninvasive temperature control of wafer processing based on diffusive reflectance spectroscopy*, Wang et al., J. Vac. Sci. Technol. B., vol. 15, No. 1, Jan./Feb. 1997, pp. 116-121.

(Continued)

*Primary Examiner* — Gail Verbitsky
(74) *Attorney, Agent, or Firm* — Dority & Manning, P.A.

(57) ABSTRACT

The temperature of an object such as a semiconductor wafer that includes silicon can be determined based on the variation of the optical absorption coefficient of silicon with temperature. Temperatures above about 850° C., can be found by measuring phenomena that are affected by the magnitude of the optical absorption coefficient, especially at wavelengths >~1 μm. Phenomena could include measuring light reflected, transmitted, emitted, absorbed, or scattered by the wafer and deriving the absorption coefficient from the measurements and then deriving temperature from the absorption coefficient. Temperature could be determined from a model relating phenomena directly to temperature, the model constructed based on absorption behavior and techniques discussed herein. The resulting temperature could be used to calibrate or control a rapid thermal processing chamber or other apparatus.

27 Claims, 10 Drawing Sheets

U.S. PATENT DOCUMENTS

| | | |
|---|---|---|
| 5,308,161 A | 5/1994 | Stein |
| 5,350,899 A | 9/1994 | Ishikawa et al. |
| 5,388,909 A | 2/1995 | Johnson et al. |
| 5,467,732 A | 11/1995 | Donnelly, Jr. et al. |
| 5,508,934 A | 4/1996 | Moslehi et al. |
| 5,568,978 A | 10/1996 | Johnson et al. |
| 5,683,180 A | 11/1997 | De Lyon et al. |
| 5,773,316 A | 6/1998 | Kurosaki et al. |
| 5,820,942 A | 10/1998 | Singh et al. |
| 5,830,277 A | 11/1998 | Johnsgard et al. |
| 5,874,711 A | 2/1999 | Champetier et al. |
| 5,930,456 A | 7/1999 | Vosen |
| 5,960,158 A | 9/1999 | Gat et al. |
| 5,970,214 A | 10/1999 | Gat |
| 5,970,382 A | 10/1999 | Shah |
| 5,980,637 A | 11/1999 | Singh et al. |
| 5,997,175 A | 12/1999 | Champetier et al. |
| 6,027,244 A | 2/2000 | Champetier et al. |
| 6,034,357 A | 3/2000 | Guardado |
| 6,056,434 A | 5/2000 | Champetier |
| 6,062,729 A | 5/2000 | Ni et al. |
| 6,074,087 A | 6/2000 | Chen et al. |
| 6,075,922 A | 6/2000 | Tay et al. |
| 6,082,892 A | 7/2000 | Adel et al. |
| 6,116,779 A | 9/2000 | Johnson et al. |
| 6,121,580 A | 9/2000 | Tsukamoto |
| 6,130,415 A | 10/2000 | Knoot |
| 6,151,446 A | 11/2000 | Hunter et al. |
| 6,158,310 A | 12/2000 | Goss et al. |
| 6,160,242 A | 12/2000 | Guardado |
| 6,168,311 B1 | 1/2001 | Xiao et al. |
| 6,174,081 B1 | 1/2001 | Holm |
| 6,174,651 B1 | 1/2001 | Thakur |
| 6,200,023 B1 | 3/2001 | Tay et al. |
| 6,200,634 B1 | 3/2001 | Johnsgard et al. |
| 6,204,484 B1 | 3/2001 | Tay et al. |
| 6,210,484 B1 | 4/2001 | Hathaway |
| 6,222,990 B1 | 4/2001 | Guardado et al. |
| 6,281,141 B1 | 8/2001 | Das et al. |
| 6,284,048 B1 | 9/2001 | Van Bilsen et al. |
| 6,293,696 B1 | 9/2001 | Guardado |
| 6,310,328 B1 | 10/2001 | Gat |
| 6,359,263 B2 | 3/2002 | Tay et al. |
| 6,369,363 B2 | 4/2002 | Hauf et al. |
| 6,403,923 B1 | 6/2002 | Tay et al. |
| 6,514,876 B1 | 2/2003 | Thakur et al. |
| 6,515,261 B1 | 2/2003 | Smargiassi et al. |
| 6,559,424 B2 | 5/2003 | O'Carroll et al. |
| 6,561,694 B1 | 5/2003 | Lerch et al. |
| 6,610,967 B2 | 8/2003 | Gat |
| 6,638,876 B2 | 10/2003 | Levy et al. |
| 6,647,350 B1 | 11/2003 | Palfenier et al. |
| 6,679,946 B1 | 1/2004 | Jackson et al. |
| 6,717,158 B1 | 4/2004 | Gat et al. |
| 6,830,942 B1 | 12/2004 | Alers et al. |
| 6,891,124 B2 | 5/2005 | Denton et al. |
| 6,953,281 B2 * | 10/2005 | Hauenstein ............ 374/161 |
| 7,112,763 B2 | 9/2006 | Hunter et al. |
| 7,543,981 B2 * | 6/2009 | Timans ............ 374/129 |
| 2002/0005400 A1 | 1/2002 | Gat |
| 2002/0017618 A1 | 2/2002 | Gat et al. |
| 2002/0104619 A1 | 8/2002 | Koren et al. |
| 2002/0137311 A1 | 9/2002 | Timans |
| 2002/0185053 A1 | 12/2002 | Fei et al. |
| 2003/0031793 A1 | 2/2003 | Chang et al. |
| 2003/0124820 A1 | 7/2003 | Johnsgard et al. |
| 2003/0209326 A1 | 11/2003 | Lee et al. |
| 2003/0235983 A1 | 12/2003 | Li et al. |
| 2003/0236642 A1 | 12/2003 | Timans |
| 2004/0061057 A1 | 4/2004 | Johnson et al. |
| 2006/0086713 A1 | 4/2006 | Hunter et al. |
| 2008/0002753 A1 | 1/2008 | Timans |

FOREIGN PATENT DOCUMENTS

| | | |
|---|---|---|
| WO | 0145501 A2 | 6/2001 |
| WO | 0145501 A3 | 6/2001 |

OTHER PUBLICATIONS

*Robust optical delivery system for measuring substrate temperature during molecular beam epitaxy*, Thibado et al., J. Vac. Sci. Technol. B., vol. 17, No. 1, Jan./Feb. 1999, pp. 253-256.
*Semiconductor substrate temperature measurement by diffuse reflectance spectroscopy in molecular beam epitaxy*, Johnson, et al., J. Vac. Sci, Technol. B., vol. 11, No. 3, May/Jun. 1993, pp. 1007-1010.
*Substrate temperature measurement by absorption-edge spectroscopy during molecular beam epitaxy of narrow-band gap semiconductor films*, de Lyon et al., J. Vac. Sci, Technol. B., vol. 15, No. 2, Mar./Apr. 1997, pp. 329-336.
*Substrate temperature reference using SiC absorption edge measured by in situ spectral reflectrometry*, Balmer et al., Journal of Crystal Growth, vol. 248, 2003, pp. 216-221.
*Systems-oriented Survey of Non-Contact Temperature Measurement Techniques for Rapid Thermal Processing*, Peyton et al., SPIE—Rapid Thermal Processing Techniques, vol. 1393, 1990, pp. 295-308.
A. Cardoso and A.K. Srivastava, "Improvements in Wafer Temperature Measurements," The Journal of Vacuum Science & Technology B., vol. 19, No. 2, Mar./Apr. 2001, pp. 397-402.
Stefan P. Svensson and David M. Gill, "Performance Evaluation of the Commercial Point of Inflection Thermometry Substrate Temperature Monitor," The Journal of Vacuum Science & Technology B., vol. 14, No. 3, May/Jun. 1996, pp. 2166-2169.
Birman, et al., "Control of Temperature Gradients and Distortion of Ion Projection Lithography Masks," J. Vac. Sci. Technol. B., vol. 13, No. 6, Nov./Dec. 1995, pp. 2584-2587.
Palik, et al., "Fabrication and Characterization of Si Membranes," J. Electrochem. Soc., vol. 135, No. 12, Dec. 1988, pp. 3126-3134.
Riordon, et al., "Stencil Mask Temperature Measurement and Control During Ion Irradiation," J. Vac. Sci. Technol. B., vol. 14, No. 6, Nov./Dec. 1996, pp. 3900-3902.
Schmid, "Optical Absorption in Heavily Doped Silicon," Physical Review B., vol. 23, No. 10, May 15, 1981, pp. 5531-5536.
Abstract of Japanese Patent No. JP63079339 (Apr. 9, 1988).
Abstract of Japanese Patent No. JP63166241 (Jul. 9, 1988).
Abstract of Japanese Patent No. JP63271127 (Nov. 9, 1988).
Abstract of Japanese Patent No. JP63285428 (Nov. 22, 1988).
*Accurate measurement of MBE substrate temperature*, Lee et al., Journal of Crystal Growth, vol. 111, 1991, pp. 131-135.
*Closed-loop control of composition and temperature during the growth of InGaAs lattice matched to InP*, Johnson, at al., J. Vac. Sci. Technol. B., vol. 17, No. 3, May/Jun. 1999, pp. 1237-1240.
*Comparison of optical pyrometry and infrared transmission measurements on indium-free mounted substrates during molecular-beam epitaxial growth*, Katzer, et al., J. Vac. Sci. Technol. B., vol. 11, No. 3, May/Jun. 1993, pp. 1003-1006.
*Diffuse reflectance spectroscopy measurement of substrate temperature and temperature transient during molecular beam epitaxy and implications for low-temperature III-V epitaxy*, Thompson, et al., Appl. Phys. Lett., vol. 70, No. 12, Mar. 24, 1997, pp. 1605-1607.
*Effect of substrate thickness, back surface texture, reflectivity, and thin film interference on optical band-gap thermometry*, Johnson, et al., Journal of Crystal Growth, vol. 175/176, 1997, pp. 273-280.
*In situ temperature control of molecular beam epitaxy growth using band-edge thermometry*, Johnson, et al., J. Vac. Sci. Technol. B., vol. 16, No. 3, May/Jun. 1998, pp. 1502-1506.
*In situ wafer temperature monitoring of silicon etching using diffuse reflectance spectroscopy*, Booth, et al., J. Vac. Sci. Technol. A., vol. 14, No. 4, Jul./Aug. 1996, pp. 2356-2360.
*Infrared-laser interferometric thermometry: A nonintrusive technique for measuring semiconductor wafer temperatures*, Donnelly, et al., J. Vac. Sci. Technol. A., vol. 8, No. 1, Jan./Feb. 1990, pp. 84-92.
*Laser Thermoprobe*, Harold Wieder, Optics Communications, vol. 11, No. 3, Jul. 1974, pp. 301-304.
*Noninvasive infrared-based measurement of the temperature of GaAs semiconductor crystals*, Malam, et al., J. Vac. Sci. Technol. A., vol. 12, No. 5, Sep./Oct. 1994, pp. 2938-2939.
*Novel Method for Measuring Transient Surface Temperatures with High Spatial and Temporal Resolution*, Harold Wieder, J. Appl. Phys., vol. 43, No. 7, Jul. 1972, pp. 3213-3214.

*Optical absorption coefficient of silicon at 1.152μ at elevated temperatures*, Jellison, et al., Appl. Phys. Lett., vol. 41, No. 7, Oct. 1, 1982, pp. 594-596.

*Optical measurement of temperature with single-crystal silicon*, Friberg, et al., Rev. Sci. Instrum., vol. 60, No. 8, Aug. 1989, pp. 2764-2767.

Publication: H.J. Goldsmid, R.W. Monk and B.A. Moys, High Temperatures—High Pressures 1, 429 (1969) (Goldsmid).

H. Rogne, P.J. Timans and H. Ahmed, Appl. Phys. Lett. 69, 2190 (1996).

*Infrared Absorption of Free Carriers in Silicon*, L. Huldt and T. Staflin, Optical Properties II, J19, pp. 385-388.

*A Method for Studying Thermal Reflection in Semiconductors*, Vavilov, et al., Soviet Physics—Solid State, vol. 12, No. 6, Dec. 1970, pp. 1329-1331.

*Fiber-optic Instrument for Temperature Measurement*, Kyuma, et al., IEEE J. Quantum Electron. 18, (1982), p. 676.

*Infra-red Transmission Spectroscopy of GaAs During Molecular Beam Epitaxy*, E.S. Hellman and J.S. Harris, Jr., Journal of Crystal Growth 81, pp. 38-42 (1987).

*Silicon temperature measurement by infrared transmission for rapid thermal processing applications*, J.C. Sturm, et al., Appl. Phys. Lett. 56 (10), Mar. 5, 1990, pp. 961-963.

*Silicon Temperature Measurement by Infrared Absorption: Fundamental Processes and Doping Effects*, James C. Sturm and Casper M. Reaves, IEEE Transactions on Electron Devices 39, No. 1, pp. 81-88 (Jan. 1992).

*A new optical temperature measurement technique for semiconductor substrates in molecular beam epitaxy*, Weilmeier, et al., Can. J. Phys. 69, pp. 422-426 (1991).

*The experimental determination of the temperature dependence of the total emissivity of GaAs using a new temperature measurement technique*, P.J. Timans, J. Appl. Phys. 72 (2), Jul. 15, 1992, pp. 660-670.

*Precision of noninvasive temperature measurement by diffuse reflectance spectroscopy*, Pearsall, et al., Rev. Sci. Instrum. 56 (10), pp. 4977-4980.

*Noncontact temperature monitoring of semiconductors by optical absorption edge sensing*, Adel, et al., SPIE vol. 1803, pp. 290-298 (1992).

*Emissivity of silicon at elevated temperatures*, P.J. Timans, J. Appl. Phys. 74 (10), Nov. 15, 1993, pp. 5353-6364.

*Variations in substrate temperature induced by molecular-beam epitaxial growth on radiatively heated substrates*, Shanabrook, et al., J. Vac. Sci. Technol. B. 11(3), May/Jun. 1993, pp. 994-997.

*Temperature Measurement of Metal-Coated Silicon Wafers by Double-Pass Infrared Transmission*, Cullen, et al., IEEE Transactions on Semiconductor Manufacturing, vol. 8, No. 3, Aug. 1995, pp. 346-351.

\* cited by examiner

DETERMINING THE TEMPERATURE OF SILICON AT HIGH TEMPERATURES

BACKGROUND

One of the most significant challenges when processing semiconductors is the ability to accurately measure the temperature of substrates during the heating process. In the past, various means and devices for measuring the temperature of substrates in thermal processing chambers have been developed. Such devices include, for instance, pyrometers and thermocouples that directly contact the substrate or that are placed adjacent to the substrate. Non-contact measurements also can be used to probe the optical properties of the substrate in order to determine temperature.

In some techniques, such as some reflectance- and transmittance-based measurements, for example, the resulting temperature measurement will be the result of the variation of the optical absorption coefficient of silicon with temperature. Different approaches have been proposed for temperature measurements with regard to determining temperature in ranges below about 800° C., but known techniques cannot be relied upon to always provide optimal, or even useful, measurements above about 800° C.

SUMMARY

As set forth below, methods and systems in accordance with one or more aspects of the present subject matter can to establish the temperature of an object including, but not limited to, a semiconductor wafer that includes silicon. The temperature is determined from the variation of the optical absorption coefficient of silicon with temperature. The focus is on the measurement of temperatures above about 850° C., and the use of phenomena that are affected by the magnitude of the optical absorption coefficient, especially at wavelengths $>\sim 1$ μm. The resulting temperature determination(s) are more accurate than would otherwise be possible given the limitations of prior approaches and their corresponding understanding of the relevant physical properties.

For instance, a method for estimating the temperature of a wafer can comprise placing a wafer comprising silicon proximate at least one measurement device. For instance, the measurement device may be in a chamber which is thermally treating the wafer. The method can further comprise performing a measurement that can be used to determine an absorption coefficient, $\alpha$, of said silicon comprising the wafer at a first wavelength, $\lambda$. For instance, performing a measurement can comprise measuring one or more of a transmittance, reflectance, emittance, or absorptance of the wafer at the first wavelength. Further, the measurements may alternatively or additionally be measurements of one or more other physical phenomena. Then, the method can comprise determining a value for said absorption coefficient, $\alpha$, of said silicon at said wavelength, $\lambda$ from the respective transmittance, reflectance, emittance, absorptance, and/or other measurement(s) that were performed.

Further, the method includes calculating an estimate of the wafer temperature, wherein said estimate takes a value that lies between a lower limit, $T-\delta T$ and an upper limit $T+\delta T$. $\delta T$ can be less than or equal to about 30 K. The actual temperature T can be represented as:

$$T = (-1210.8 + 1863.6\lambda - 506.84\lambda^2)\alpha^{0.46449 - 0.38607\lambda + 0.10584\lambda^2},$$

when the value of T is in degrees Centigrade, the value of said wavelength, $\lambda$, is in units of microns, and the value of said absorption coefficient, $\alpha$, is in units of $cm^{-1}$. However, the above expression does not need to be evaluated in the actual estimation of T, although it could be evaluated in some embodiments. Further, in some embodiments, $\delta T$ can be less than or equal to 15 K, and in some embodiments is less than or equal to 5 K.

In some embodiments, the value of said absorption coefficient, $\alpha$, is greater than about 300 $cm^{-1}$. Further, in some embodiments, the first wavelength may lie between about 1.2 and about 2.4 μm. For instance, the first wavelength lies within 0.1 μm of one of the following wavelengths: 1.31, 1.54, and 2.3 μm.

In some embodiments, a method for estimating the temperature of a wafer comprises placing a wafer comprising silicon proximate at least one measurement device and performing one or more measurements that can be used to determine an absorption coefficient, $\alpha$, of said silicon comprising the wafer at a first wavelength, $\lambda$, determining a value for said absorption coefficient, $\alpha$, of said silicon at said wavelength, $\lambda$; and calculating an estimate of the wafer temperature, T as a function of the measured or determined absorption coefficient, $\alpha$.

In some embodiments, the accuracy of the calculated value of T can be evaluated by looking at the value of the determined absorption coefficient, $\alpha$, (whether measured directly or derived value from one or more other measurements). Specifically a suitable guidepost or gauge of accuracy can be the degree to which the determined value of $\alpha$ differs from that of a value of an empirically-derived value, $\alpha_{calc}$, which is a function of the measured/estimated temperature and the wavelength used for the measurement.

For instance, in some embodiments, $\alpha$ differs from $\alpha_{calc}$ by no more than 30%. It should be noted that a comparison between $\alpha_{calc}$ and a measured or determined value for $\alpha$ does not need not to occur during a temperature measurement calculation (although, of course, it could be in some embodiments).

$\alpha_{calc}$ can be determined by an expression having substantially the following form when the value of said wavelength, $\lambda$, is in units of microns:

$$\alpha_{calc} = \left[135\left(\frac{1.24}{\lambda}\right) + 0.07T - 168\right]^2 + 8.2869 \times 10^{-6} \lambda^{1.5}(T+273)^{3.1867} \exp\left(-\frac{7000}{T+273}\right).$$

In certain embodiments, temperature can be determined from the above expression or an expression based on the above expression. For instance, a measured value of $\alpha$ could be substituted into the above expression for $\alpha_{calc}$ and the expression then solved for T. Of course, the above expression could be solved for T as a function of $\alpha_{calc}$ before substituting $\alpha$ for $\alpha_{calc}$.

In some embodiments, the value of said absorption coefficient, $\alpha$, is greater than about 300 $cm^{-1}$. Further, in some embodiments, the first wavelength may lie between about 1.2 and about 2.4 μm. For instance, the first wavelength lies within 0.1 μm of one of the following wavelengths: 1.31, 1.54, and 2.3 μm.

It will be understood that other forms or variants of the equations discussed herein (including those for T and $\alpha_{CALC}$, above) could be used to determine temperature, determine absorption coefficients, evaluate the accuracy of temperature measurements, and/or evaluate the accuracy of absorption coefficient determinations. As an example, other equations tuned for specific wavelengths or wavelength ranges of interest could be developed.

As was noted above, the estimate of wafer temperature may be greater than 850° C., although of course the estimate may be lower or higher.

In some embodiments, the step of placing a wafer proximate at least one measurement device comprises placing the wafer into a thermal processing chamber, the at least one measurement device configured to perform measurements of one or more properties of objects in the chamber.

The thermal processing chamber can comprise one or more other measurement devices, such as a second measurement device configured to perform measurements of one or more properties of objects in the chamber. In such instances, the method can further comprise calibrating the at least one second measurement device based on the calculated estimate of wafer temperature. As one example, the second measurement device can comprise a pyrometer.

"Calibrating" can refer to any operation whereby measurement values of the second measurement device(s) are correlated to temperature readings. For instance, calibrating may comprise storing a set of calibration constants which are used to relate measurement device outputs to temperature values and/or defining a mathematical operator which accepts measurement device outputs and provides a corresponding temperature value.

BRIEF DESCRIPTION OF THE DRAWINGS

A full and enabling disclosure including the best mode of practicing the appended claims, directed to one of ordinary skill in the art, is set forth more particularly in the remainder of the specification, which makes reference to the appended figures, where like reference numerals are intended to represent analogous features, and in which:

DETAILED DESCRIPTION

Reference will now be made in detail to various embodiments of the present subject matter, one or more examples of which are illustrated in the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the disclosure herein includes modifications and variations as come within the scope of the appended claims and their equivalents.

Figure 1:
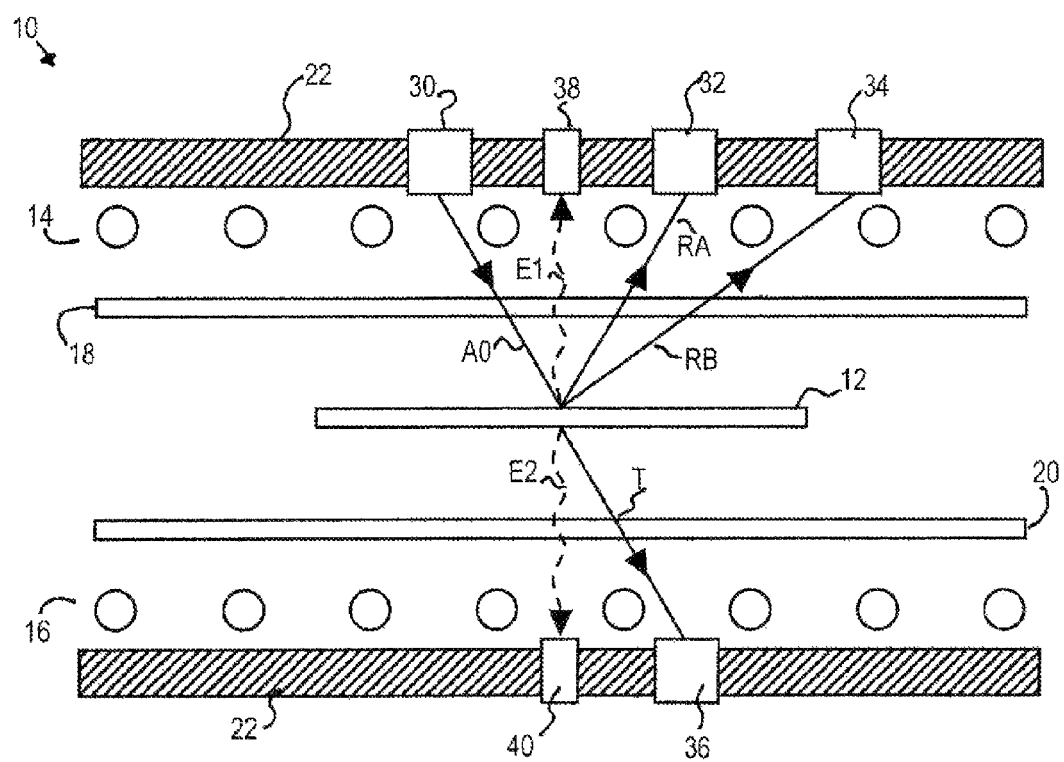
FIG. 1 is a diagram showing an exemplary processing chamber and wafer positioned therein.

FIG. 1 illustrates an exemplary RTP process chamber 10 where the wafer 12 is heated by banks of lamps 14 and 16. In the example shown the banks of lamps are both above (14) and below (16) the wafer. The wafer is supported within a process environment that is isolated from the surroundings by windows both above (18) and below (20) the wafer 12.

One of skill in the art will recognize that chamber 10 is merely exemplary, and the embodiments disclosed herein are equally usable in other types of chambers and chambers including configurations other than what is shown in FIG. 1. For instance, although lamps are shown above and below the wafer, this is not necessarily the case in other chamber designs. Indeed, in other suitable chambers, the lamps may be replaced or supplemented by other heating sources, such as different lamp arrangements, a susceptor, hot plate, or other contact-based heating approach, conductive heating, convective heating, RF or microwave sources, scanning lasers, and particle beams.

It should also be understood, however, that besides wafers, chamber 10 may also be adapted to process optical parts, films, fibers, ribbons, and other substrates, and the use of the term "wafer" in the present disclosure is for example only, and is not meant to exclude any other particular shapes or substrates.

One of skill in the art will recognize that a variety of processes may be carried out in chambers such as the one illustrated in FIG. 1 and for which accurate temperature measurements may be desired. For instance, the chamber may be configured and used for heat treatment or annealing of a substrate, during oxidation of the substrate, diffusion treatment, or during other processes which modify, add films, or otherwise involve a reaction of the surface and/or other part(s) of the substrate. Other processes may include any suitable film deposition process, such as a chemical vapor deposition process or an atomic layer deposition process. Still further processes may include plasma processing, ion implantation, ion implantation damage annealing, silicide formation, reflow, depositing a material on a substrate, or etching a substrate.

The windows may be made of quartz glass, sapphire, AlON, or any other material that can transmit the energy from the lamps to the wafer. The lamps are contained within a chamber that has walls 22. The walls may reflect lamp radiation to improve the coupling of lamp energy to the wafer. Although energy is indicated as being projected through the same windows as used by the various sensors to monitor emitted, reflected, and transmitted energy, chambers may be configured so that energy is projected through windows separate from those through which the emitted, reflected, and transmitted energy is monitored. In fact, each such sensor could have a separate window, and any window could be configured to transmit or block certain ranges of energy in order to enhance measurement capabilities of the system.

The system also has various sensors and optical instruments that can be used to monitor the wafer during processing, as well as other equipment (not shown) to implement wafer processes, such as gas inlets/outlets, cooling systems, and the like.

FIG. 1 shows an exemplary configuration of instruments and sensors and an exemplary light source 30. Light source 30 is a source, or combination of sources, that can illuminate the wafer surface by emitting a ray A0 that is incident on the wafer. The reflected light ray RA corresponds to an essentially specular reflection from the surface of the wafer. The reflected energy in ray RA can be detected by a sensor 32. The reflected or scattered light ray RB corresponds to energy from ray A0 that is reflected in a non-specular direction. Such a ray can arise if the ray A0 encounters a surface in the wafer that is inclined relative to the surface that produces reflected ray RA. It can also arise from a scattering effect or a diffraction effect. The energy in ray RB can be detected by a sensor 34.

Some of the energy from A0 may also pass through the wafer, forming a transmitted ray T. The energy in this ray can be detected by a sensor 36. Either or both reflected rays may be the result of partial transmission through, and then reflection by, the wafer (e.g. a ray that passes through an outer layer of the wafer and then is reflected by one or more layers below). In some embodiments, sensors may monitor for light transmitted or partially transmitted through wafer 10 from the bottom side to the top side of the wafer. Additionally, a monitored transmitted ray may be one that was transmitted in a non-specular or a specular direction. Further, although a separate light source 30 is shown, any optical measurements could additionally or alternatively be based on light originating from heating lamps or sources (14 and/or 16) that is transmitted, reflected, and/or scattered by the wafer.

Sensors can also monitor energy emitted by wafer 12 itself. For example, a hot wafer will emit thermal radiation. Sensor 38 can detect the radiation that is emitted from the top surface of the wafer, E1. Sensor 40 can detect the radiation that is emitted from the bottom surface of the wafer, E2. The angle of incidence of ray A0, and the angles at which the various sensors view the wafer surface can be selected as desired. Furthermore, the wavelength of the radiation emitted by source 30 can be selected as desired.

Source 30 may be a narrow band source, such as a laser, or a broadband source such as a lamp, an LED, a superluminescent LED, a super-continuum light source or a hot object. In some applications it may even be an RF source, a microwave source, or a THz radiation source, for example. In general it is a source of electromagnetic radiation, emitting radiation in the wavelength range between 100 nm and 1 m. The wavelength range emitted by source 30 can be selected or altered by the use of optical filters. When laser sources are used, the wavelength can be selected, for example, by choice of the type of laser, or by using a tunable laser, or a multi-wavelength laser and by manipulating the laser wavelength through the use of non-linear optical media such as frequency doublers and mixers. The state of polarization of the light emitted from source 30 can also be controlled. For laser sources, which often produce polarized light, this may involve controlling the orientation of the laser and/or manipulating the orientation of the beam to obtain a particular state of polarization with respect to incidence of the ray A0 on the wafer surface.

For all sources 30, the polarization may also be controlled by the use of polarizing and/or retarding optical elements. The output of energy from source 30 may be continuous, pulsed or modulated so that it varies with time. The state of polarization, the angle of incidence and the wavelength may also be modulated if desired. Although the radiation from source 30 is shown passing through the window, it may also be guided into the process environment by other means, such as light pipes, waveguides or optical fibers. In some cases the radiation from source 30 might not be able to pass through the window material selected from transmission of lamp radiation. In this case a separate section of the window can be included, which is made of a material that allows passage of the energy from source 30.

Filtering and polarizing elements can also be included in the optics in front of the sensors 32, 34, 36, 38, and 40. Such filters can be used to determine the state of polarization and the wavelength range of the energy that is detected in the rays that are reflected, scattered, transmitted or emitted by the wafer.

RTP chamber 10 and its components may be linked to a controller or controllers (not shown) for accumulating and processing measurement results and controlling the light sources, heat sources, and other components used in carrying out treatment processes. For example, the light sensors and pyrometers may be linked to appropriate circuitry and/or one or more processors running algorithms to implement the various methods disclosed herein and perform various tasks such as, e.g., a computer system configured to calculate wafer absorption based on light measured using the various sensors as discussed below. Generally, any suitable combination of hardware or hardware and software can be used to control the sensors and/or other aspects of RTP chamber 10 and to perform processes on wafers/objects therein.

The temperature of the object that is being measured can be established by measuring the degree of optical absorption at a given wavelength in a part of the object that comprises silicon. For example the optical absorption may be obtained from a measurement of the transmittance of a wafer that includes a silicon layer, as described in U.S. patent application Ser. No. 10/178,950, filed Jun. 24, 2002 and published as 20030236642A1 on Dec. 25, 2003. As another example, the optical absorption may be obtained from a measurement of the reflectance of a wafer including a silicon layer, as described in U.S. patent application Ser. No. 11/478,312, filed Jun. 29, 2006. In general, any optical measurement that is sensitive to the degree of absorption in a silicon material can be used. Other types of optical measurement can include measurements of absorptance or emittance. In fact, any phenomenon sensitive to absorption could be exploited to deduce an absorption coefficient, and so the present subject matter is not limited only to measurements involving standard optical properties.

The measurements can be related to the temperature of the silicon material through the relationship between the absorption coefficient, $\alpha$, of silicon at a given wavelength of radiation, $\lambda$, and the temperature, T. For example, by deducing $\alpha$ from an optical measurement and comparing it to a pre-established curve that predicts $\alpha$ at the wavelength $\lambda$ as a function of temperature, we can deduce a value for T for any given value of α. For this approach to work it is necessary to have access to accurate data for α as a function of temperature. For silicon, there have been many previous studies of α as a function of temperature for temperatures <800° C., but no reliable data above this temperature. In order to overcome this limitation, careful measurements of α as a function of temperature were performed at temperatures above 800° C., including measurements up to 1100° C. The measurements were performed at wavelengths of 1.31, 1.54 and 2.3 μm. The wavelengths were selected in the near-infra-red part of the spectrum, because the absorption coefficient of silicon is relatively low there, as opposed to its value at wavelengths <1 μm.

A relatively low value for the absorption coefficient, e.g. less than ~$10^4$ cm$^{-1}$, can be useful in some types of measurements. For example, such a value allows the absorption coefficient to be established through measurements of the optical properties of sheets of silicon of a thickness greater than ~5 μm. This is useful, because it can be difficult to work with extremely thin sheets of silicon, and furthermore, for very thin sheets their optical properties may start to deviate in an unpredictable manner from those of bulk silicon.

Figure 2:
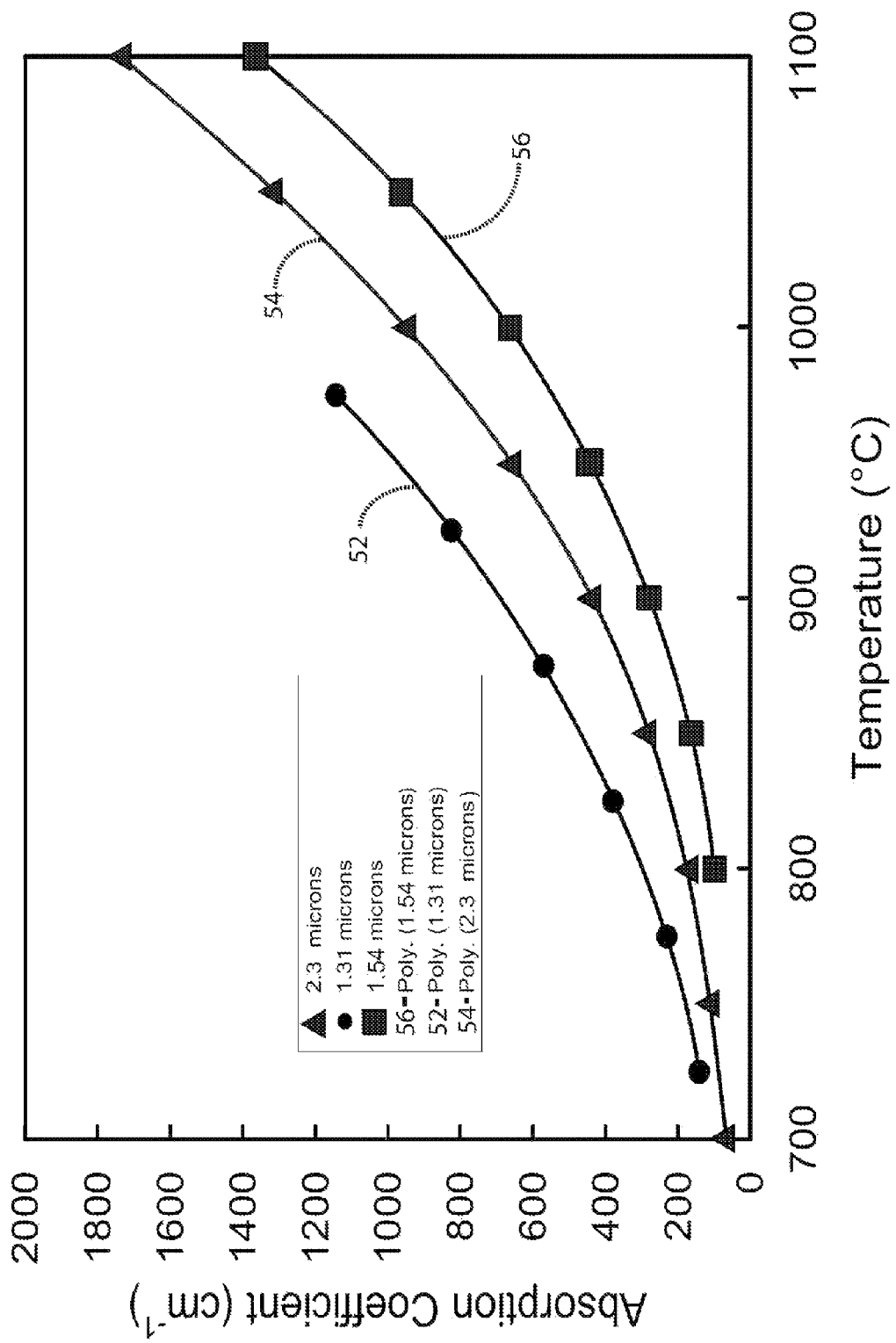
FIG. 2 is a graph showing new data regarding the absorption coefficient of silicon at wavelengths of 1.31, 1.54, 2.3 μm and accompanying respective curve fits.

FIG. 2 shows measurement data regarding the absorption coefficient of silicon (y-axis) as a function of temperature (x-axis) for the three wavelengths considered here. Specifically, in FIG. 2, curves for wavelengths of 1.31 μm, 2.3 μm, and 1.54 μm are shown at 52, 54, and 56, respectively, and are fits to the measurement data ("new data" below). In FIG. 2, the absorption can be calculated from a polynomial fit to the absorption coefficient at each wavelength, as described by an equation of the form:

$$\alpha_{Si} = \sum_{i=0}^{4} A_i T_C^i, \quad \text{(Equation A)}$$

where $\alpha_{Si}$ is the measured value of the absorption coefficient of silicon in units of cm$^{-1}$ and $T_C$ is the temperature in ° C. In Equation (A) the polynomial is a quartic function, and the summation over the index i adds up the various terms of the polynomial. $A_i$ is the coefficient of the term of the polynomial where $T_C$ is raised to the power i. The coefficients for each of the three wavelengths are given below.

TABLE A

Coefficients for quartic polynomial fit (Equation A) that describes the measured absorption coefficient of silicon.

|  | Wavelength | | |
| --- | --- | --- | --- |
|  | 1.31 μm | 1.54 μm | 2.3 μm |
| $A_0$ | 3.632433 × $10^4$ | 4.002451 × $10^4$ | −2.152712 × $10^4$ |
| $A_1$ | −1.680142 × $10^2$ | −1.718140 × $10^2$ | 1.011942 × $10^2$ |
| $A_2$ | 2.914564 × $10^{-1}$ | 2.789008 × $10^{-1}$ | −1.742175 × $10^{-1}$ |
| $A_3$ | −2.270963 × $10^{-4}$ | −2.049313 × $10^{-4}$ | 1.282249 × $10^{-4}$ |
| $A_4$ | 6.866667 × $10^{-8}$ | 5.848485 × $10^{-8}$ | −3.272494 × $10^{-8}$ |
| Temperature range of fit | 725° C.-975° C. | 800° C.-1100° C. | 700° C.-1100° C. |

Figure 3:
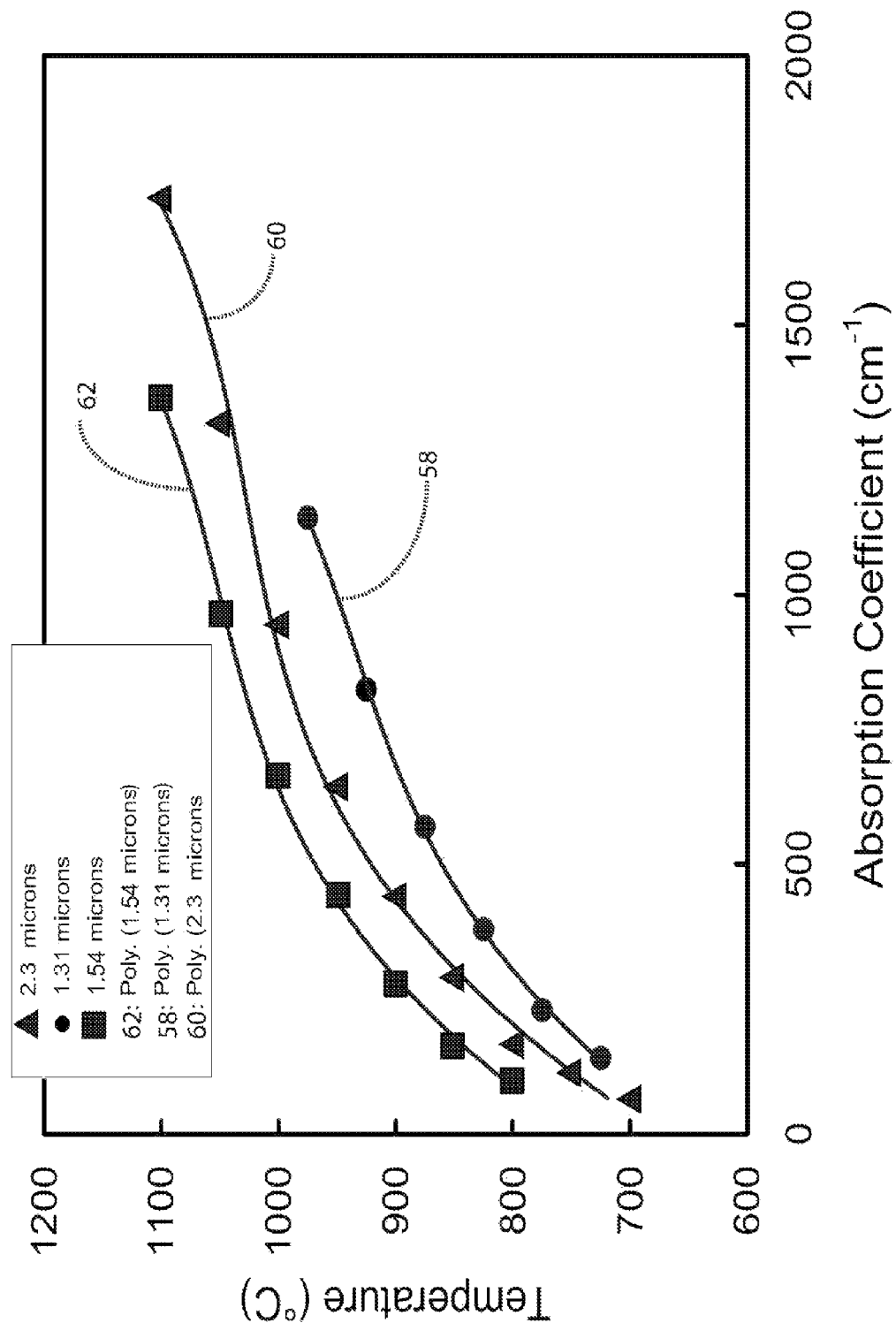
FIG. 3 is a graph of exemplary polynomial curves for deducing temperature from absorption at 1.31, 1.54 or 2.3 μm.
Figure 4:
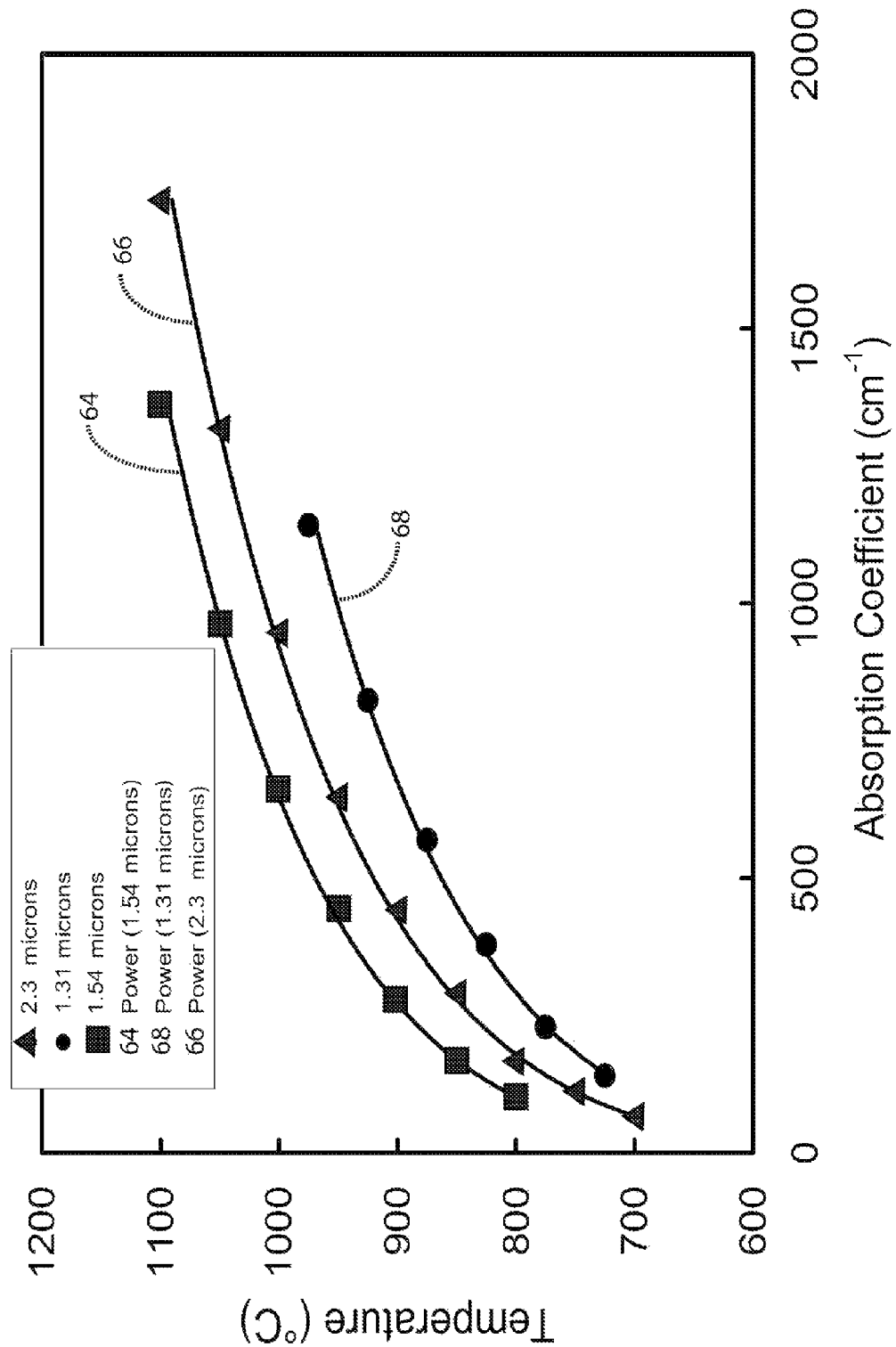
FIG. 4 is a graph of exemplary power-law curves for deducing temperature from absorption at 1.31, 1.54 or 2.3 μm.

FIG. 3 and FIG. 4 show two approaches for how the temperature can be deduced from the characteristics shown in FIG. 2. In FIG. 3 and FIG. 4, the temperature (y-axis) is shown as a function of the absorption coefficient (x-axis), and each figure includes a fitted function that gives an expression that predicts a temperature value corresponding to any given absorption coefficient. In FIG. 3, the temperature is deduced from a polynomial fit to the absorption coefficient at each wavelength, as described by an equation of the form:

$$T_{meas} = \sum_{i=0}^{N} a_i \alpha_{meas}^i, \quad \text{(Equation 1)}$$

where $\alpha_{meas}$ is the measured value of the absorption coefficient in units of cm$^{-1}$ and $T_{meas}$ is the deduced value of temperature in ° C. In FIG. 3, the curves 58, 60, and 62 are for wavelengths of 1.31 μm, 2.3 μm, and 1.54 μm, respectively. In FIG. 4, the curves 64, 66, and 68 are for 1.54 μm, 2.3 μm, and 1.31 μm, respectively.

In Equation (1) the polynomial is of degree N, and the summation over the index i adds up the various terms of the polynomial. $a_i$ is the coefficient of the term of the polynomial where $\alpha_{meas}$ is raised to the power i. For the example of the cubic polynomial (N=3) given in FIG. 3, the coefficients for each of the three wavelengths are given in Table 1.

TABLE 1

Coefficients for cubic polynomial fit (Equation 1 with N = 3) that allows deduction of temperature from measured absorption coefficient.

|  | Wavelength | | |
| --- | --- | --- | --- |
|  | 1.31 μm | 1.54 μm | 2.3 μm |
| $a_0$ | 645.09 | 743.87 | 672.39 |
| $a_1$ | 0.66334 | 0.68916 | 0.73314 |
| $a_2$ | −0.00057046 | −0.00057336 | −0.00054996 |
| $a_3$ | 2.1253 × $10^{-7}$ | 1.9066 × $10^{-7}$ | 1.5585 × $10^{-7}$ |
| Range of absorption coefficients (cm$^{-1}$) | 100-1200 | 100-1400 | 50-1400 |
| Temperature range of fit | 725° C.-975° C. | 800° C.-1100° C. | 700° C.-1100° C. |

FIG. 4 shows how the temperature can also be deduced from a power-law fit to the absorption coefficient, where the equation is of the form $$T_{meas} = b\alpha_{meas}^r, \quad \text{(Equation 2)}$$

where once again $\alpha_{meas}$ is the measured value of the absorption coefficient in units of cm$^{-1}$ and $T_{meas}$ is the deduced value of temperature in ° C. b and r are constants that are given for each of the three wavelengths in Table 2.

TABLE 2

Coefficients for power law fit (Equation 2) that allows deduction of temperature from measured absorption coefficient.

|  | Wavelength | | |
| --- | --- | --- | --- |
|  | 1.31 μm | 1.54 μm | 2.3 μm |
| b | 360.66 | 457.05 | 394.21 |
| r | 0.14037 | 0.12095 | 0.13641 |
| Range of absorption coefficients (cm$^{-1}$) | 100-1200 | 100-1400 | 50-1400 |
| Temperature range of fit | 725° C.-975° C. | 800° C.-1100° C. | 700° C.-1100° C. |

Clearly there are many possible approaches for providing functions that fit the data given in FIGS. 2, 3 and 4. For example, a given value of $\alpha_{meas}$ that lies between the measured points in FIG. 2 can be interpreted by a linear interpolation between the points. This is a simple approach, and may give larger errors, so more sophisticated methods, such as fitting a smooth function through the points might be preferred. For example, a spline fit could be used to interpolate between the points. The fit can also be refined to provide a closer match to any given temperature range of interest. For example, a smooth curve could be fitted to only the points between 900 and 1050° C. Different curves could also be fitted to different regions of the data, as desired. It is also possible to generate a look-up table of the data values and use this to interpret any given value of $\alpha_{meas}$. Regardless of the approach taken, the temperature $T_{meas}$, deduced from any given measured value of $\alpha_{meas}$ (that falls within the corresponding range of $\alpha_{meas}$ values mentioned in table 1 and 2) should fall within a range of +30° C. of the value for $T_{meas}$ predicted by equation 1 or equation 2. For more precise determination of temperature, it should fall within ±15° C. of this value, and for the highest accuracy work it should fall within ±5° C. of this value.

Of course, alternative wavelengths could be used for the measurement of the absorption coefficient. In this case, the required data is not directly available from FIG. 2. For any given measurement wavelength, the absorption coefficient can be determined, and a similar fitting exercise performed. However, it is also possible to use the data given in FIG. 2 and to extrapolate between the measurement wavelengths. This is possible by creating functions that describe $T_{meas}$ in terms of $\alpha_{meas}$ and $\lambda$.

For example, one approach is to generate functions that include terms describing the wavelength dependence of the polynomial coefficients in equation 1. For example, we can fit a polynomial function of the wavelength to each of the coefficients $a_i$ in equation (1). Thus each coefficient, $a_i$, would be represented by a function of the wavelength, $\lambda$, of the form $$a_i \sum_{j=0}^{M_i} c_{i,j} \lambda^j, \quad \text{(Equation 3)}$$

where the polynomial is of degree $M_i$, and the summation over the index j adds up the various terms of the polynomial. $c_{i,j}$ is the coefficient of the term of the polynomial giving $a_i$ where $\lambda$ is in units of μm and is raised to the power j. For the example of the quadratic polynomials ($M_i=2$ for all i), the coefficients $c_{i,j}$ are given in Table 3.

TABLE 3

The quantities $c_{i,j}$ that describe the coefficients for quadratic fits for the wavelength dependence of the coefficients ai in equation (1).

| $c_{i,j}$ | j = 0 | j = 1 | j = 2 |
|---|---|---|---|
| i = 0 ($a_0$) | −984.37 | 1936.6 | −528.82 |
| i = 1 ($a_1$) | 0.40544 | 0.26885 | −0.054942 |
| i = 2 ($a_2$) | −0.00046551 | −0.00013754 | 4.3837 × 10⁻⁵ |
| i = 3 ($a_3$) | 4.3752 × 10⁻⁷ | −2.3697 × 10⁻⁷ | 4.9782 × 10⁻⁸ |

Hence, for example, the coefficient $a_0$ would be given by $$a_0 = c_{0,0} + c_{0,1}\lambda + c_{0,2}\lambda^2 = -984.37 + 1936.6\lambda - 528.82\lambda^2, \quad \text{(Equation 4)}$$

where $\lambda$ is in units of μm, and all the other polynomial coefficients, $a_i$, in equation (1) can be calculated in a similar fashion. The resulting approach can be summarized by the equation $$T_{meas} = \sum_{i=0}^{N} \left( \sum_{j=0}^{M_i} c_{i,j} \lambda^j \right) \alpha_{meas}^i, \quad \text{(Equation 5)}$$

This approach allows estimates to be made for any wavelength between ~1.25 μm and ~2.35 μm for temperatures between ~725 and ~1000° C., but the cubic form of the polynomial used to fit the results in FIG. 2 makes the use of this expression less reliable for temperatures outside the fitted range. An alternative is provided by using a similar approach to determine the wavelength dependence of the coefficients b and r in equation (2). These can also be described by a polynomial fit to the wavelength. For example, by considering the results for the measurement wavelengths 1.31, 1.54 and 2.3 μm, the wavelength dependence of b can be summarized by the expression $$b(\lambda) = -1210.8 + 1863.6\lambda - 506.84\lambda^2, \quad \text{(Equation 6)}$$

where $\lambda$ is in units of μm.

Likewise, the wavelength dependence of r can be summarized by the expression $$r(\lambda) = 0.46449 - 0.38607\lambda + 0.10584\lambda^2, \quad \text{(Equation 7)}$$

where $\lambda$ is in units of μm. Hence one can deduce $T_{meas}$ (in ° C.) for any measured absorption coefficient (in units of cm⁻¹) at a measurement wavelength, $\lambda$ (in units of μm), from the expression $$T_{meas} = (-1210.8 + 1863.6\lambda - 506.84\lambda^2)\alpha_{meas}^{(0.46449 - 0.38607\lambda + 0.10584\lambda^2)}. \quad \text{(Equation 8)}$$

Although these approaches provide simple ways to estimate the temperature given a value for the absorption coefficient at a given wavelength, they would not give the greatest possible accuracy at wavelength that are significantly different to 1.31, 1.55 or 2.3 μm, where the original measurements of the absorption coefficient were obtained. A more accurate approach is possible by creating a model for the optical absorption coefficient that reflects the underlying physics, and hence can more accurately predict the dependence of absorption on the wavelength and the temperature.

Figure 5:
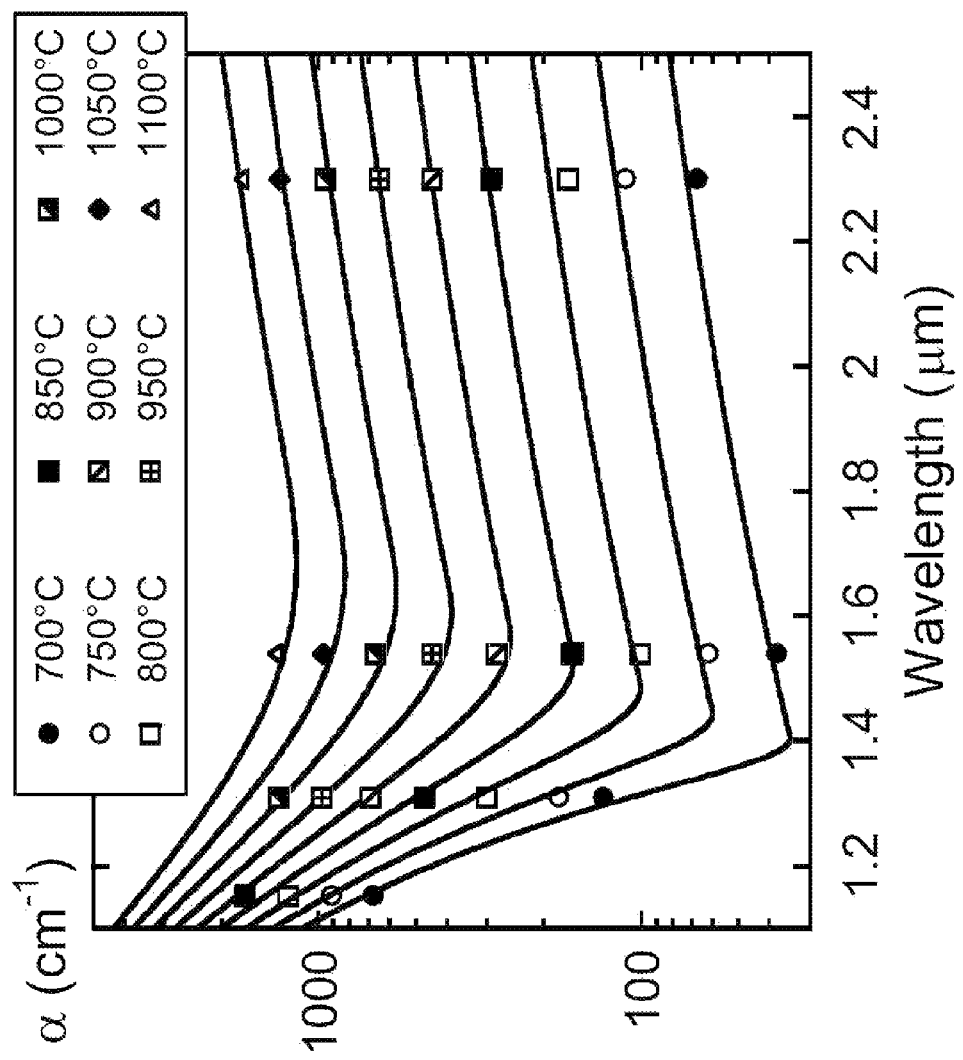
FIG. 5 is a semi-empirical physical model for absorption, showing predictions as function of wavelength, together with experimental data from measurements at 1.152, 1.31, 1.54 and 2.3 μm, for temperatures between 700 and 1100° C.

FIG. 5 shows the measured values of absorption as functions of wavelength, for temperatures between 700 and 1100° C., together with literature data from the work of G. E. Jellison, Jr. and D. H. Lowndes, who measured the temperature dependence of the absorption of silicon at a wavelength of 1.152 μm, at temperatures up to ~867° C. The data were fitted with a model that reflects two absorption processes, a part that involves band-edge absorption, $\alpha_{BG}(\lambda, T_C)$ and a part that involves absorption by free-carriers $\alpha_{FC}(\lambda, T_C)$. The model enables predictions of the magnitude of these two components of absorption as a function of the wavelength $\lambda$ (in μm) and the temperature $T_C$ (in ° C.) The absorption at any given wavelength and temperature is given by the sum of these two components.

Since silicon is an indirect band gap semiconductor, $\alpha_{BG}(\lambda, T_C)$ was selected to be proportional to the square of the difference between the photon energy and an energy threshold. The energy threshold was chosen to decrease linearly with temperature, to reflect the effect of the decrease in the band gap of silicon with temperature. The resulting model is summarized by the equation $$\alpha_{BG}(\lambda, T_C) = \left[135\left(\frac{1.24}{\lambda}\right) + 0.07T_C - 168\right]^2 \quad \text{(Equation 9)}$$

where $T_C$ is the temperature in °C., $\lambda$ is the wavelength in μm and $\alpha_{BG}(\lambda,T_C)$ is in units of cm$^{-1}$.

The function representing $\alpha_{FC}(\lambda,T_C)$ was chosen to reflect the temperature dependence of the free carrier density in silicon, since this absorption component should be approximately proportional to the concentration of free carriers. The latter is approximately proportional to $(T_C+273)^{1.5}\exp\{-7000/(T_C+273)\}$. However the absorption process also has some temperature dependence, which was included by making $\alpha_{FC}(\lambda,T_C)$ proportional to $(T_C+273)^u\exp\{-7000/(T_C+273)\}$, where the power u was fitted to match the trend with temperature. The wavelength dependence of $\alpha_{FC}(\lambda,T_C)$ was selected so that it is proportional to $\lambda^{1.5}$, because at high temperatures in lightly-doped silicon the free-carrier absorption process is expected to be dominated by scattering of carriers by lattice vibrations. Hence, the model for free-carrier absorption is described by the expression $$\alpha_{FC}(\lambda, T_C) = \quad \text{(Equation 10)}$$
$$8.2869 \times 10^{-6} \lambda^{1.5} (T+273)^{3.1867} \exp\left(-\frac{7000}{T_C+273}\right),$$

where $T_C$ is the temperature in °C., $\lambda$ is the wavelength in μm and $\alpha_{FC}(\lambda,T_C)$ is in units of cm$^1$.

The total absorption can be described by the equation $$\alpha(\lambda,T_C) = \alpha_{BG}(\lambda,T_C) + \alpha_{FC}(\lambda,T_C). \quad \text{(Equation 11)}$$

This expression can be used to deduce the value for the absorption coefficient at any given wavelength and temperature. FIG. 5 shows that it provides a good fit to the measured data for wavelengths between 1.1 and 2.5 μm and temperatures between 700 and 1100° C.

Figure 6:
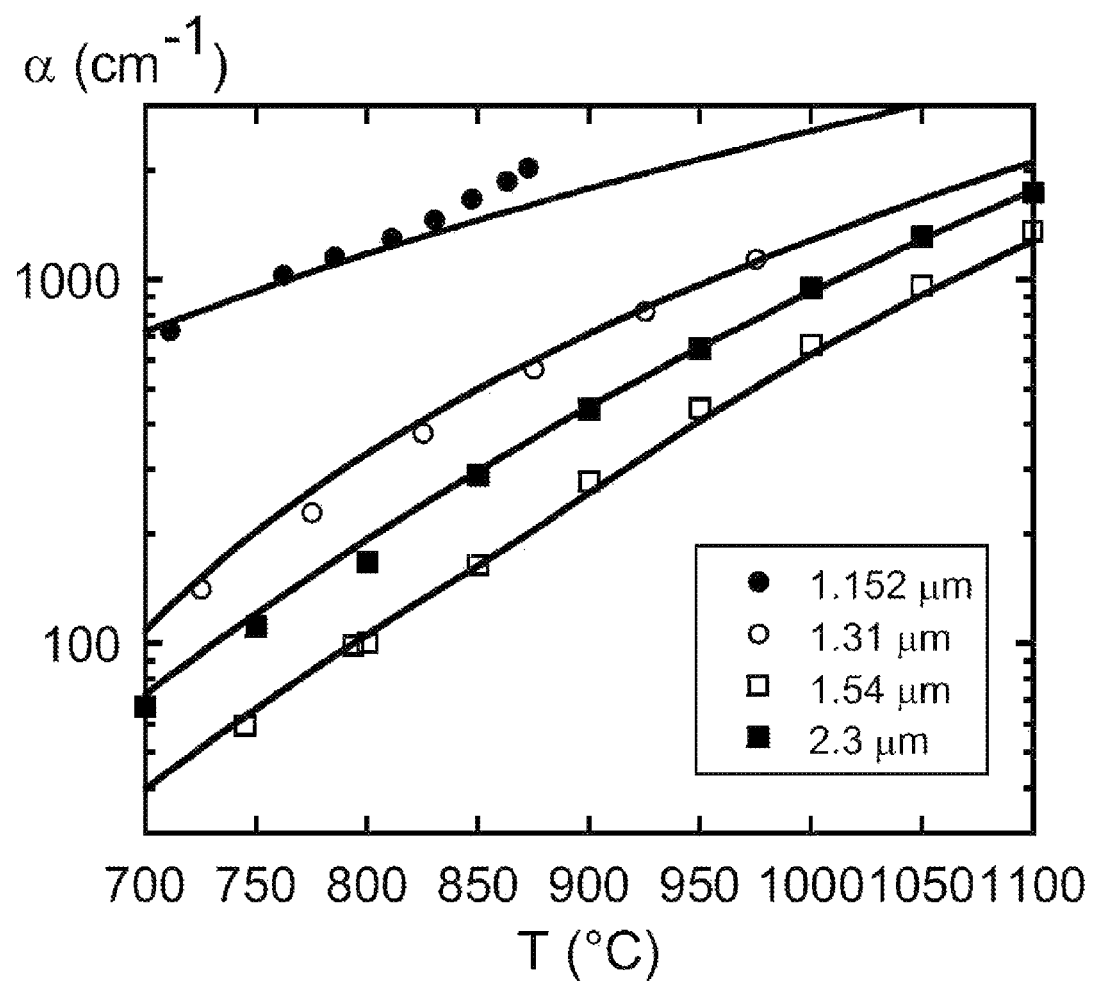
FIG. 6 is a semi-empirical physical model for absorption, showing predictions as function of temperature, together with experimental data from measurements at 1.152, 1.31, 1.54 and 2.3 μm, for temperatures between 700 and 1100° C.

FIG. 6 shows how the model matches the temperature dependence of absorption at the measurement wavelengths used to generate the experimental data. Because this model was developed to match the underlying physical processes that determine the magnitude of the absorption coefficient, it should be possible to apply it over a broader temperature and wavelength range, e.g. for temperatures from 600 to 1200° C. and for wavelengths between 1.1 and 20 μm. It will also provide a more reliable guide for estimating the absorption coefficient at any wavelength, including wavelengths between 1.15 and 2.3 μm, especially for temperatures between 700 and 1100° C.

Equations 9, 10 & 11 can also be used to deduce a temperature for any measured value of the absorption coefficient that falls within the range that is valid for the fit. The range of absorption coefficients covered by the fit is from ~40 cm$^{-1}$ up to ~2000 cm$^{-1}$. Although the equations are more complex than the polynomial or power-law forms discussed earlier, a value for temperature can be obtained from any given value of absorption coefficient at a given wavelength. For example the value can be obtained by interpolation or by an iterative solution of the non-linear equations. Regardless of the approach taken, if the value of the temperature, $T_{meas}$, deduced from the measured absorption coefficient, $\alpha_{meas}$, is substituted back into equations 9, 10 & 11, then the calculated absorption coefficient, $\alpha(\lambda,T_{meas})$, should fall close to $\alpha_{meas}$. For example, the difference between $\alpha(\lambda,T_{meas})$ and $\alpha_{meas}$ should no greater than 30%, and more preferably less than 20% of the value of $\alpha_{meas}$. One can also note that the temperature of the sample can also be deduced by measuring the absorption at more than one wavelength, and using the model of Eqns. 9-11 to create a simulated absorption spectrum. The simulated spectrum can be matched to the measured spectrum by varying the value used for $T_{meas}$ until there is a close match to the values obtained at the measurement wavelengths.

One suitable guidepost of the accuracy of a temperature determination may be through the use of a value $\alpha_{calc}$ representing a calculated absorption coefficient as a function of measured temperature and measurement wavelength. Then, the value of $\alpha_{calc}$ can be compared to a measured or derived value of $\alpha$ in order to determine how "close" a measurement truly is. As the values of $\alpha_{calc}$ and measured/derived value of $\alpha$ converge, the measured value of T will be closer to the "real" value of T (i.e. the temperature as predicted from on the models and equations herein). Of course, in practice, $\alpha_{calc}$ itself does not need to be evaluated during a temperature measurement calculation or absorption coefficient measurement. $\alpha_{calc}$ can be determined by an expression (based on Equations 9, 10, and 11 above) having substantially the following form when the value of said wavelength, $\lambda$, is in units of microns:

$$\alpha_{calc} = \left[135\left(\frac{1.24}{\lambda}\right) + 0.07T - 168\right]^2 +$$
$$8.2869 \times 10^{-6} \lambda^{1.5} (T+273)^{3.1867} \exp\left(-\frac{7000}{T+273}\right).$$

Of course, it is not necessary that the approach taken to implement this invention requires explicit identification and measurement of a value of the absorption coefficient. For example, it may be more convenient to measure an optical property whose magnitude depends on the absorption coefficient. For example, this could be transmittance, reflectance, absorptance or emittance of an object that comprises a silicon material, such as a single crystal silicon layer. In such cases, the temperature dependence of the optical property that is measured can be related to that of the absorption coefficient by standard optical calculations (i.e. the absorption coefficient can be derived from the other measurement(s)).

In some embodiments, the magnitude of the optical property can be estimated as a function of temperature through use such calculations, and then the predicted temperature dependence can be used in combination with measurements of the property in order to deduce the sample's temperature.

Of course, it is also possible to create a reference calibration of the magnitude of optical property as a function of temperature, and then to deduce a measured temperature by comparing the measured value of the optical property to the calibration curve. However, such an approach is less reliable if the temperature must be measured on a sample that is not identical to that used to create the calibration curve. For example, the thickness of the silicon layer may vary between samples. This would cause a change in transmittance and introduce a temperature measurement error. The effect of such an error can be completely eliminated by measuring the layer's thickness and deducing the absorption coefficient, which only depends on temperature and not on thickness.

Any optical property or other measurable phenomenon that is affected by the absorption coefficient can also be measured at more than one wavelength, and a model can be used to predict the wavelength dependence of the property/phenomenon, where the model takes account of the wavelength and temperature dependence of the absorption coefficient, for example through the use of equations 9-11. This approach allows one to establish the temperature of the sample by varying the temperature used in the model in order to minimize the difference between the measured and modeled values of the optical property.

Finally, the data and models described herein can be used to improve the accuracy of predictions of optical and thermal phenomena relating to the behaviour of silicon materials at high temperatures. For example, they can be used to improve the accuracy of predictions of the effects of laser, lamp or other radiant heating of semiconductor materials. They can also be used to improve the accuracy of models of temperature measurement apparatus, especially for use with silicon at temperatures >700° C.

The present subject matter may be especially useful for performing the measurement of temperatures above ~850° C., and the use of the optical absorption coefficient at wavelengths >~1 μm. This approach has generally been regarded as impossible without accurate measurements of the temperature dependence of the absorption coefficient of silicon at such temperature and wavelength ranges and has not been developed despite a long-felt need in the semiconductor processing industry for accurate high-temperature measurements.

Non-contact temperature measurements, such as the absorption-based or absorption-derived temperature measurement techniques discussed herein, are especially favored in the semiconductor processing industry due to the need for accurate measurements without physically disturbing the wafer being processed.

Further, the techniques discussed above yield unexpected and surprising results in light of extrapolation of previous models. For instance, consider the following three published accounts that include experimental data about the absorption of infra-red radiation by single crystal silicon at temperatures greater than ~800° C.

One publication, J. C. Sturm and C. M. Reaves, IEEE Trans. Electron Devices 39, 81 (1992). ("Sturm and Reaves") includes some data on absorption at a wavelength of 1.55 μm that goes up to a temperature of ~880° C.

A second publication, H. J. Goldsmid, R. W. Monk and B. A. Moys, High Temperatures—High Pressures 1, 429 (1969) ("Goldsmid"), included spectral measurements of the transmittance of thin sheets of silicon at temperatures up to ~922° C. The spectra included measurements in the wavelength region between ~1.1 and 2.5 μm.

A third study, G. E. Jellison, Jr. and D. H. Lowndes, Appl. Phys. Lett. 41, 594 (1982) ("Jellison, Jr. and Lowndes"), only included data at a wavelength of 1.152 μm, at temperatures up to ~870° C.

Previous studies have been used to validate semi-empirical models for infra-red absorption in silicon, that have been shown to give a close match to experimental data, for temperatures below ~800° C. See, for instance, H. Rogne, P. J. Timans and H. Ahmed, Appl. Phys. Lett. 69, 2190 (1996) ("Rogne"). However, such models may not be able to predict absorption behaviour at higher temperatures accurately.

Figure 7:
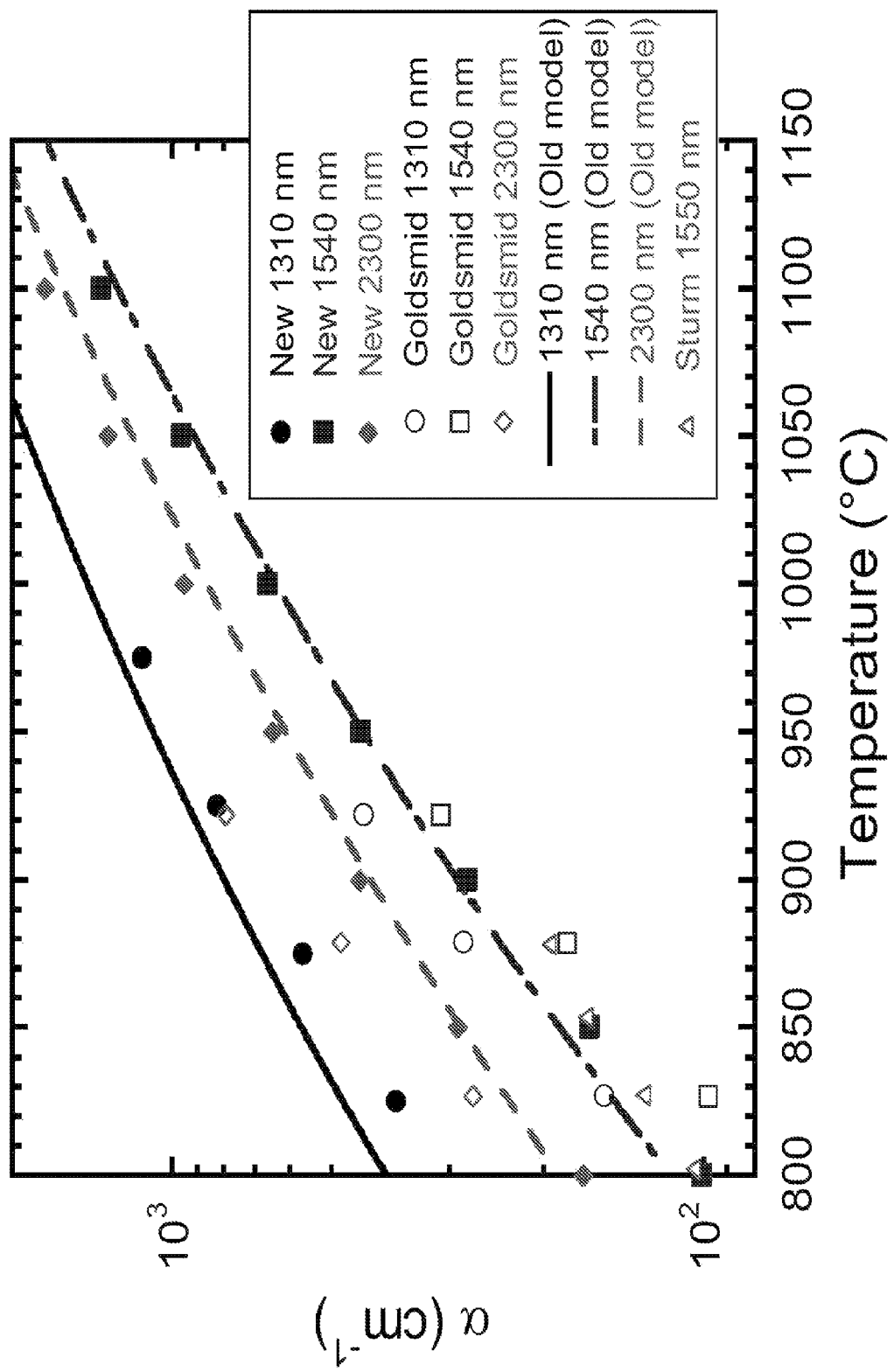
FIG. 7 is a graph showing the temperature dependence of the absorption coefficient of silicon at wavelengths of 1.31, 1.54 and 2.3 μm, including new data alongside previous measurements and extrapolations from a previous model for optical absorption in silicon.

For example, FIG. 7 compares the new data from measurements disclosed hereinabove, with data from the studies of Goldsmid and Sturm. The data were extracted from graphs reproduced in these papers, and there may be some errors in that extraction, but nevertheless it is immediately apparent that the data from Goldsmid do not closely follow the trends shown in the data used in conjunction with and to develop the models used in embodiments of the present subject matter. The new data serving as the basis for the present subject matter also disagree with the data from Sturm.

Furthermore, data extracted from Goldsmid for absorption at 1.152 μm disagree strongly with the study from Jellison. The significant differences between the Goldsmid's measurements and all the other studies suggest that the use of this data as a predictor of high temperature absorption in silicon is likely to be unreliable.

The data from Sturm's measurements at 1.55 μm do fall close to some of the presently disclosed measurements at 1.54 μm, at least for temperatures less than about 860° C. However, Sturm's measurements give no guidance as to the absorption behaviour at higher temperatures.

FIG. 7 also includes predictions based on the model described by Rogne. This model approximately matches the trends seen in the absorption at 1.54 μm and 2.3 μm, but differs strongly from the data at 1.3 μm. It also does not provide a very close fit to the data at any of the wavelengths discussed in the present disclosure. For example, if one were to rely on the Rogne model to deduce the temperature corresponding to an absorption of 965 cm$^{-1}$ at a wavelength of 1.54 μm, one could obtain a temperature of 1058° C., whereas the data discussed hereinabove showed that the real temperature was 1050° C. This error of ~8° C. would significantly exceed the accuracy required for the calibration of temperature in an RTP process, where temperatures must typically be established with an accuracy better than 5° C. Furthermore, there is no indication in the Rogne materials that the use of the model at such higher temperatures would be worth pursing. Rather, other models have not successfully been extrapolated or otherwise applied to such high temperatures.

Figure 8:
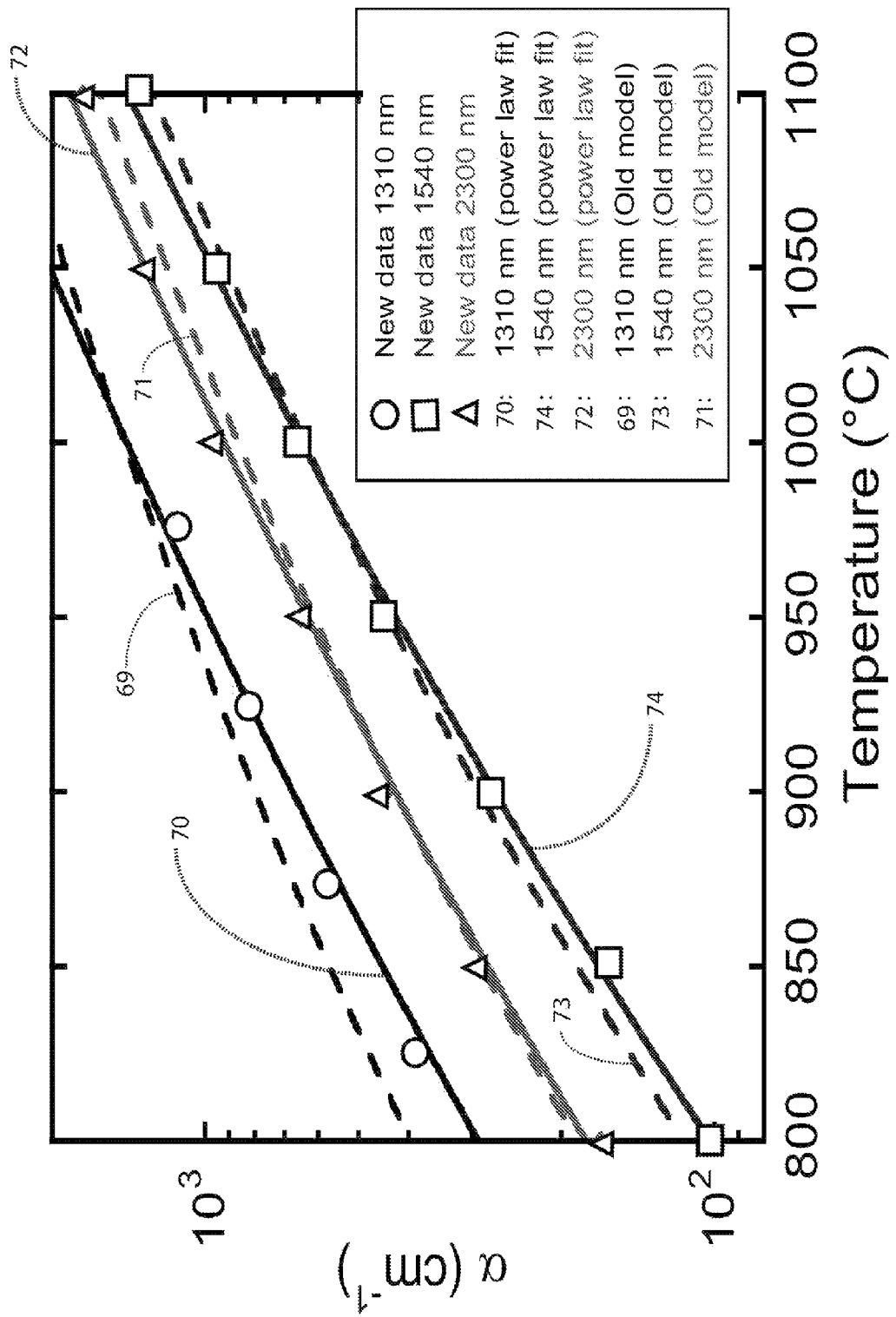
FIG. 8 is a graph showing the temperature dependence of the absorption coefficient of silicon at wavelengths of 1.31, 1.54 and 2.3 μm, including new data, a power-law fit to the new data, and extrapolations from a previous model for optical absorption in silicon.

FIG. 8 shows data (i.e. "new data") underlying the present subject matter, together with the extrapolation from the Rogne model of reference as well as one of the new fits suggested above using equation (8). Specifically, curve 69 represents extrapolation from the Rogne model at 1.31 μm, while curve 70 shows a new fit in accordance with the present subject matter at 1.31 μm. Curve 71 represents extrapolation from the Rogne model at 2.3 μm, while curve 72 shows a new fit in accordance with the present subject matter at 2.3 μm. Further, curve 73 is an extrapolation from Rogne at 1.54 μm, while curve 74 is a fit in accordance with the new data.

The power law fit matches the data at all three wavelengths better than the predictions from the Rogne model. Clearly the use of the new experimental data for high temperature absorption in silicon can significantly improve the accuracy in defining the wafer temperature on the basis of an absorption measurement.

Figure 9:
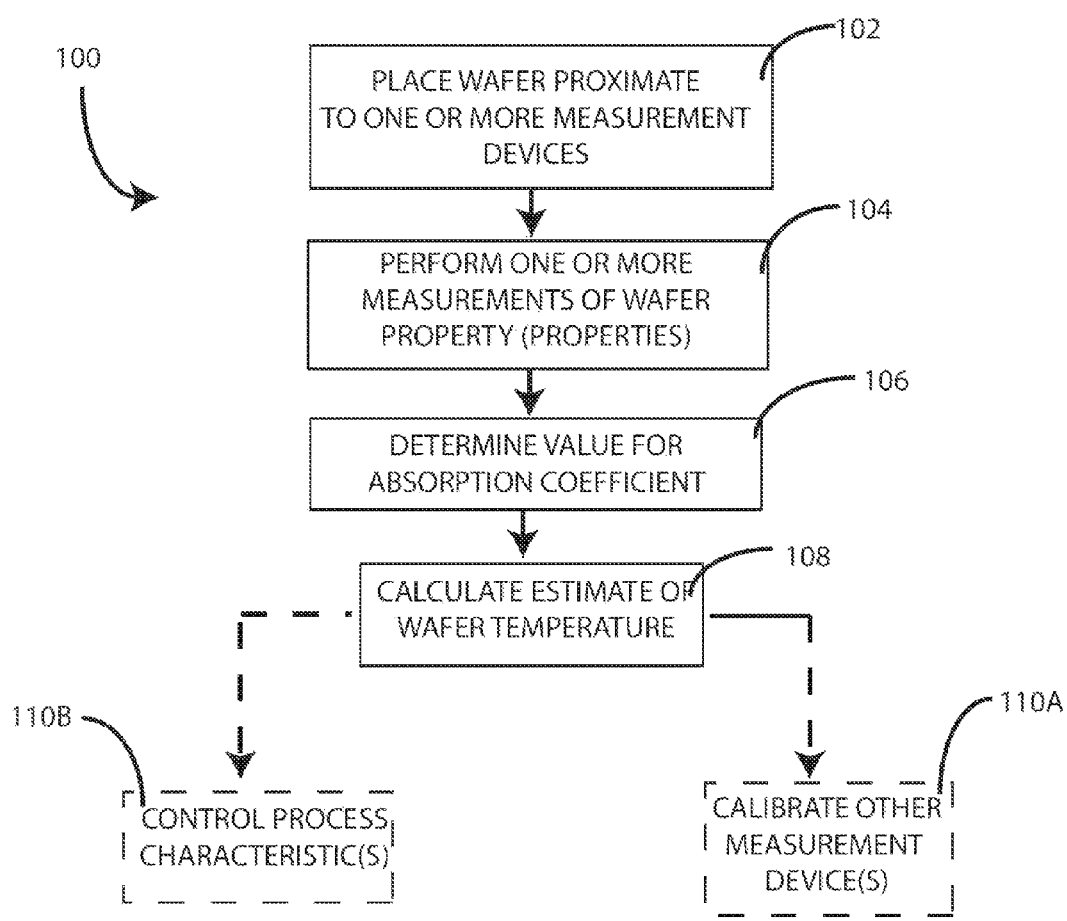
FIG. 9 is a flowchart showing steps in an exemplary measurement process in which temperature is determined based on determining the optical absorption coefficient of silicon.

FIG. 9 is a flowchart showing steps in an exemplary process 100 for performing an absorption-based determination or estimate of the temperature of a wafer or other object comprising silicon in accordance with the present subject matter. At step 102, a wafer comprising silicon is placed proximate at least one measurement device. For instance, one or more measurement devices can be used to gather data used to determine an absorptance, transmittance, reflectance, or emittance. The device(s) may be in a chamber or may be positioned outside a chamber in a manner so that light emitted, reflected, and/or transmitted by the wafer can be measured. For instance, one or more devices may observe the wafer through a window or other barrier.

At step 104, one or more measurements are performed to gather measurement data that can be used to determine an absorption coefficient, α, of silicon comprising the wafer at a first wavelength, λ. Then, at step 106, a determination of λ value for the absorption coefficient, α, at wavelength, λ is made. As was noted earlier, multiple values of α may be determined at multiple wavelengths λ in some embodiments.

Step 108 represents calculating an estimate of the wafer temperature, with the estimate having a value that lies between a lower limit, T−δT and an upper limit T+δT, where T represents the "actual" temperature according to the models and equations discussed herein.

δT can be less than or equal to 30 K, when a proper absorption-based model is used in the calculation, and may be less than 15, or less than 5 K in some embodiments. The value T can be found using the equation below based on the measured or derived value of α:

$$T = \frac{(-1210.8 + 1863.6\lambda - 506.84\lambda^2)}{\alpha^{0.46449 - 0.38607\lambda + 0.10584\lambda^2}},$$

However, T does not necessarily need to be deduced from the expression above as part of any method of determining temperature in all embodiments.

Another suitable guidepost of the accuracy of a temperature determination may be through the use of the value $\alpha_{calc}$ as noted above. Of course, in practice, $\alpha_{calc}$ itself does not need to be evaluated during a temperature measurement calculation. $\alpha_{calc}$ can be determined by an expression having substantially the following form when the value of said wavelength, λ, is in units of microns:

$$\alpha_{calc} = \left[135\left(\frac{1.24}{\lambda}\right) + 0.07T - 168\right]^2 + 8.2869 \times 10^{-6} \lambda^{1.5} (T+273)^{3.1867} \exp\left(-\frac{7000}{T+273}\right).$$

Steps 110A and 110B represent optional steps which may either or both occur once a temperature estimate is available. For instance, as shown at 110A, the estimate can be used to calibrate one or more other measurement devices. For instance, the temperature estimate can be used to ensure that a pyrometer or other device relied upon for process temperature measurements is providing accurate temperature readings. The other measurement devices may be calibrated during a calibration session which may, for instance, use one or more calibration wafers with known properties. However, standard wafers could be used. Furthermore, in some embodiments, calibration represents an operation that occurs while a wafer is being processed. For instance, while temperature measurements are made using one or more pyrometers, the pyrometer readings could be "corrected" based on a contemporaneous absorption-based temperature estimate.

In some embodiments, the absorption-based temperature measurement or estimate could be used as an input in a control program which operates based on wafer temperature. This is shown at step 110B, in which the absorption-based temperature measurement or estimate could be used alone or alongside other temperature data to control heating levels, ramp rates, gas flows, and/or other process characteristics. Additionally or alternatively to control or calibration, the estimate may simply be used as an output in some embodiments, and may be used for any other suitable purpose or purposes.

In some embodiments, the temperature may be determined at one or more times during a heating process or other time interval where the temperature increases or decreases. In some such embodiments, the temperature determination may be within the bounds of accuracy discussed earlier for each measurement within a range of temperatures, such as over a range from about 850° C. to 1100° C. or one or more sub-ranges therein.

Figure 10:
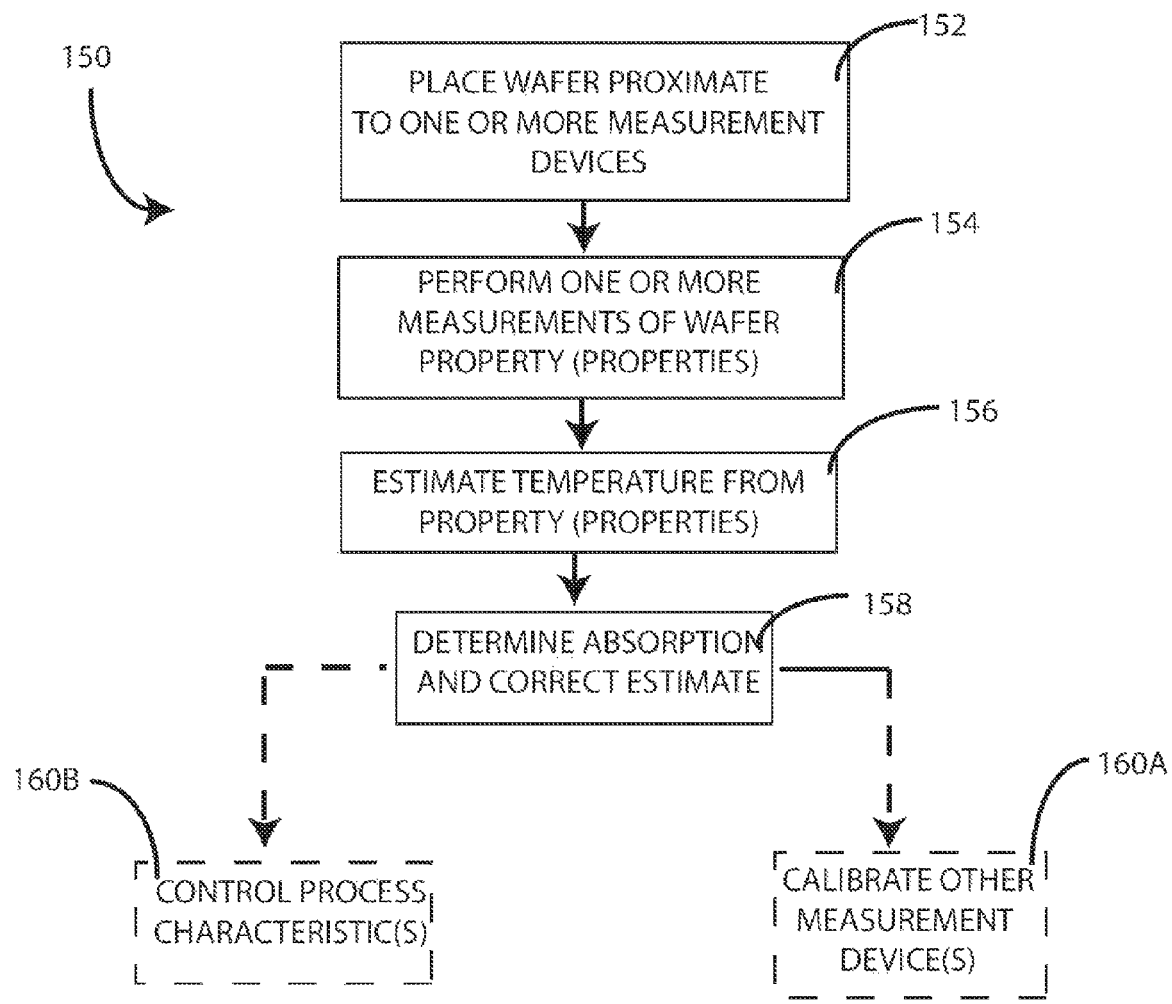
FIG. 10 is a flowchart showing steps in another exemplary measurement process in which temperature is determined based on one or more properties of a wafer and then corrected based on determining the optical absorption coefficient of silicon.

FIG. 10 is a flowchart showing another exemplary process 150. In this embodiment, at step 152 a wafer is placed proximate one or more measurement devices as noted above. At step 154, one or more measurements of wafer properties are performed, but in this embodiment such measurements may or may not be used to determine an absorption coefficient of the wafer. Instead, such measurement(s) may be directly used to estimate temperature as shown at 156. For instance, a model may be developed as noted above which relates transmittance, emittance, reflectance, or absorptance of the wafer directly to temperature. However, such models may not be entirely accurate for all circumstances. Thus, at step 158 the absorption coefficient is determined and the temperature estimate is corrected (if needed). The absorption coefficient could be determined from the data obtained in the measurement(s) of step 154 and/or by another measurement of wafer property or properties. Steps 160A and 160B represent optional calibration and control steps, respectively, which may proceed based on the temperature estimate as noted earlier. As an alternative, the estimate may simply be provided as an output in some embodiments.

In the discussion above, several examples were given in which an absorption coefficient was measured or derived from another measurement and used to determine temperature. It will be understood that, in additional embodiments, the underlying data and techniques discussed herein could be used as a basis for temperature measurement processes that do not necessarily derive an absorption coefficient as part of the measurement process.

For instance, in some such embodiments, a method for determining the temperature of an object comprising silicon can include creating a model for how the magnitude of a measurement of a property (or properties) of said object is related to the absorption coefficient of silicon. Then, the equations noted above (and/or variants thereof) can be used in conjunction with the model to predict the dependence of said magnitude on the temperature of said object. Once the dependence is determined, one or more measurements of the object or associated phenomena can be performed. If the model(s) are developed correctly, the resulting temperature reading(s) obtained from said magnitude(s) should be within the same degree of accuracy as the readings resulting from measurements which more directly involve absorption coefficient. As noted above, the temperature reading(s) could then be used for any suitable purpose, e.g. to calibrate another temperature measurement device.

It is appreciated by persons skilled in the art that the presently disclosed subject matter is not limited in scope by what has been particularly shown and described above, which constitute various examples. Rather, as set forth in the attached claims, the scope includes both combinations and sub-combinations of various features discussed herein, along with such variations and modifications as would occur to a person of skill in the art.

What is claimed:

1. A method for estimating the temperature of a wafer, the method comprising:

placing a wafer comprising silicon proximate at least one measurement device;

performing a measurement that can be used to determine an absorption coefficient, α, of said silicon comprising the wafer at a first wavelength, λ;

determining a value for said absorption coefficient, α, of said silicon at said wavelength, λ; and calculating an estimate of the wafer temperature, wherein said estimate takes a value that lies between a lower limit, T−δT and an upper limit T+δT;

wherein δT is less than or equal to 30 K, and $$T=(-1210.8+1863.6\lambda-506.84\lambda^2)\alpha^{0.46449-0.38607\lambda+0.10584\lambda^2},$$

when the value of T is in degrees Centigrade, the value of said wavelength, λ, is in units of microns, and the value of said absorption coefficient, α, is in units of $cm^{-1}$.

2. The method set forth in claim 1, wherein:
performing a measurement comprises measuring a transmittance of the wafer at the first wavelength; and
the value of the absorption coefficient of the silicon is determined from the transmittance.

3. The method set forth in claim 1, wherein:
performing a measurement comprises measuring a reflectance of the wafer at the first wavelength; and
the value of the absorption coefficient of the silicon is determined from the reflectance.

4. The method set forth in claim 1, wherein:
performing a measurement comprises measuring an emittance of the wafer at the first wavelength; and
the value of the absorption coefficient of the silicon is determined from the emittance.

5. The method set forth in claim 1, wherein:
performing a measurement comprises measuring an absorptance of the wafer at the first wavelength; and
the value of the absorption coefficient of the silicon is determined from the absorptance.

6. The method set forth in claim 1, wherein the value of said absorption coefficient, α, is greater than about 300 $cm^{-1}$.

7. The method set forth in claim 1, wherein the first wavelength lies between about 1.2 and about 2.4 μm.

8. The method set forth in claim 1, wherein the first wavelength lies within 0.1 μm of one of the following wavelengths: 1.31, 1.54, and 2.3 μm.

9. The method set forth in claim 1, wherein the estimate of wafer temperature is greater than 850° C.

10. The method set forth in claim 1, wherein placing a wafer comprising silicon proximate at least one measurement device comprises placing the wafer into a thermal processing chamber, the at least one measurement device configured to perform measurements of one or more properties of objects in the chamber.

11. The method set forth in claim 10, wherein:
the thermal processing chamber comprises a second measurement device configured to perform measurements of one or more properties of objects in the chamber; and
the method further comprises calibrating the at least one second measurement device based on the calculated estimate of wafer temperature.

12. The method set forth in claim 11, wherein the second measurement device comprises a pyrometer.

13. The method set forth in claim 1, wherein δT is less than or equal to 5 K.

14. The method set forth in claim 1, wherein calculating an estimate of the wafer temperature comprises evaluating an expression substantially in the form of:

$$T=(-1210.8+1863.6\lambda-506.84\lambda^2)\alpha^{0.46449-0.38607\lambda+0.10584\lambda^2},$$

wherein T represents the value of the estimated temperature in degrees Centigrade, the value of said wavelength, λ, is in units of microns, and the value of said absorption coefficient, α, is in units of $cm^{-1}$.

15. A method for estimating the temperature of a wafer, the method comprising:
placing a wafer comprising silicon proximate at least one measurement device;
performing a measurement that can be used to determine an absorption coefficient, α, of said silicon comprising the wafer at a first wavelength, λ;
determining a value for said absorption coefficient, α, of said silicon at said wavelength, λ; and
calculating an estimate of the wafer temperature, T;
wherein the calculated value of T is in degrees centigrade and is such that the value of the determined absorption coefficient, α, in units of $cm^{-1}$, differs from that of a value of $\alpha_{calc}$ by no more than 30% when $\lambda_{calc}$ is determined by an expression having the following form when the value of said wavelength, λ, is in units of microns:

$$\alpha_{calc} = \left[135\left(\frac{1.24}{\lambda}\right) + 0.07T - 168\right]^2 + 8.2869 \times 10^{-6} \lambda^{1.5}(T+273)^{3.1867} \exp\left(-\frac{7000}{T+273}\right).$$

16. The method set forth in claim 15, wherein calculating an estimate of the wafer temperature T is based on providing said absorption coefficient into an expression of temperature as a function of α, the expression of temperature as a function of α representing a solution of the following equation for T:

$$\alpha = \left[135\left(\frac{1.24}{\lambda}\right) + 0.07T - 168\right]^2 + 8.2869 \times 10^{-6} \lambda^{1.5}(T+273)^{3.1867} \exp\left(-\frac{7000}{T+273}\right).$$

17. The method set forth in claim 15, wherein:
performing a measurement comprises measuring a transmittance of the wafer at the first wavelength; and
the value of the absorption coefficient of the silicon is determined from the transmittance.

18. The method set forth in claim 15, wherein:
performing a measurement comprises measuring a reflectance of the wafer at the first wavelength; and
the value of the absorption coefficient of the silicon is determined from the reflectance.

19. The method set forth in claim 15, wherein:
performing a measurement comprises measuring an emittance of the wafer at the first wavelength; and
the value of the absorption coefficient of the silicon is determined from the emittance.

20. The method set forth in claim 15, wherein:
performing a measurement comprises measuring an absorptance of the wafer at the first wavelength; and
the value of the absorption coefficient of the silicon is determined from the absorptance.

21. The method set forth in claim 15, wherein the value of said absorption coefficient, α, is greater than about 300 $cm^{-1}$.

22. The method set forth in claim 15, wherein the first wavelength lies between about 1.2 and about 2.4 μm.

23. The method set forth in claim 15, wherein the first wavelength lies within 0.1 μm of one of the following wavelengths: 1.31, 1.54, and 2.3 μm.

24. The method set forth in claim 15, wherein the estimate of wafer temperature is greater than 850° C.

25. The method set forth in claim 15, wherein placing a wafer comprising silicon proximate at least one measurement device comprises placing the wafer into a thermal processing chamber, the at least one measurement device configured to perform measurements of one or more properties of objects in the chamber.

26. The method set forth in claim 25, wherein:
the thermal processing chamber comprises a second measurement device configured to perform measurements of one or more properties of objects in the chamber; and the method further comprises calibrating the at least one second measurement device based on the calculated estimate of wafer temperature.

27. The method set forth in claim 26, wherein the second measurement device comprises a pyrometer.

* * * * *